UNITED STATES PATENT OFFICE.

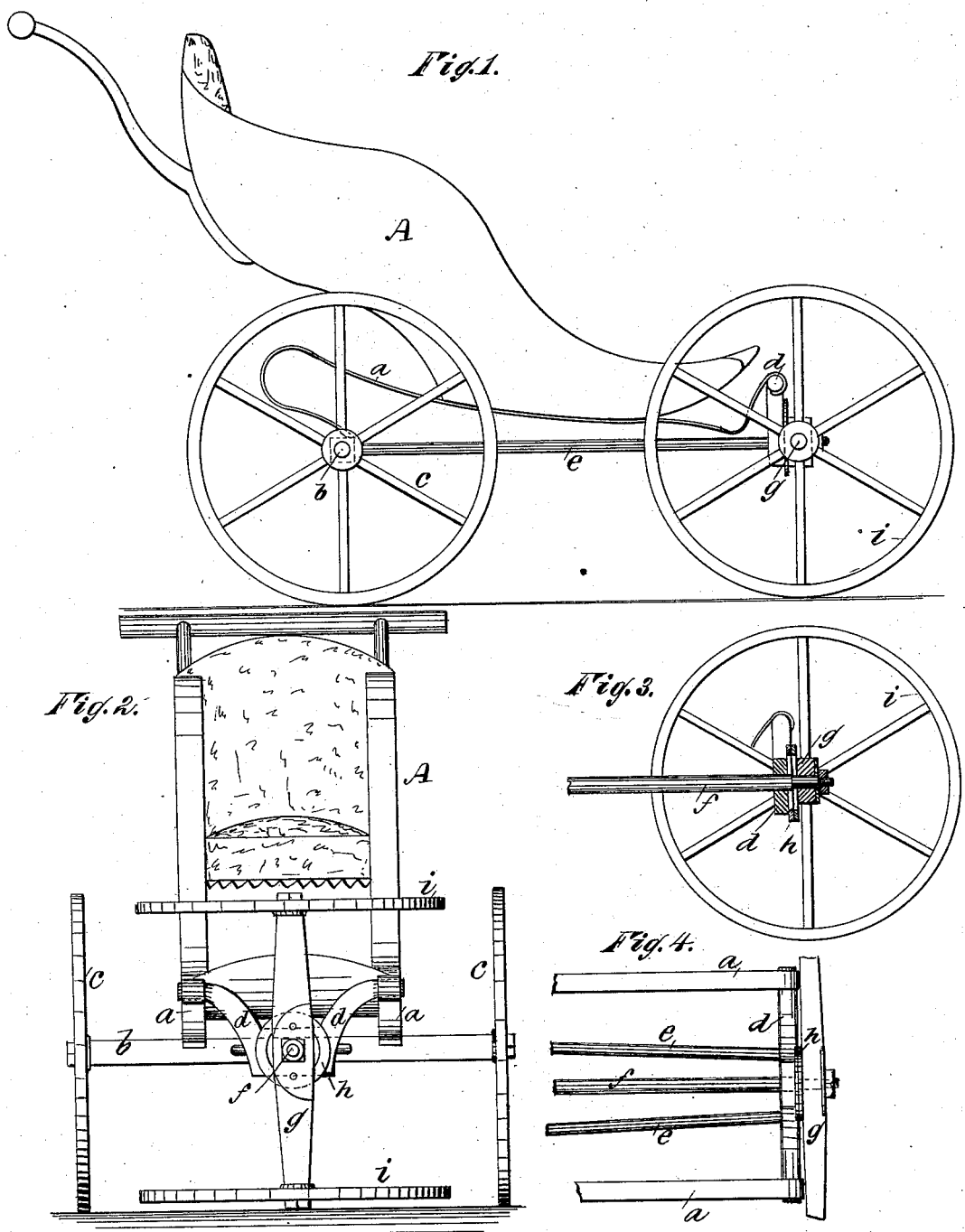

HIRAM SEAMAN, OF NEW YORK, N. Y.

CHILD'S CARRIAGE.

SPECIFICATION forming part of Letters Patent No. 247,953, dated October 4, 1881.

Application filed August 4, 1881. (No model.)

*To all whom it may concern:*

Be it known that I, HIRAM SEAMAN, of the city, county, and State of New York, have invented a new and useful Improvement in Children's Carriages, of which the following is a full, clear, and exact specification.

The object of my invention is to prevent the accidents which frequently occur to children's carriages from the wheels running over obstructions, and also by rolling down inclines when unattended. For that purpose I fit the forward axle of such a carriage for revolution on a horizontal spindle, so that either side can rise as the wheel passes over an obstruction without raising or jarring the carriage, and the axle can also be swung to a vertical position for supporting and anchoring the carriage.

My invention consists in certain novel features of construction, whereby the objects named are attained without complicated mechanism.

In the accompanying drawings, Figure 1 is a side elevation of a carriage containing my invention. Fig. 2 is a front view of the same, with the forward axle turned in a vertical position. Fig. 3 is a cross-section of the front axle and forward gearing, and Fig. 4 is a plan view of the forward gearing.

Similar letters of reference indicate corresponding parts.

A is the body, supported on springs $a$. $b$ is the rear axle; and $c$ the rear wheels, all of which are of usual construction.

$d$ is a cross-bar supporting the forward ends of springs $a$, and connected to the rear axle by reaches $e$ $e$.

$f$ is a fixed rod extending from the rear axle, $b$, to and through the bar $d$, and on the end of this rod, in front of bar $d$, is the forward axle, $g$. The axle $g$ is held on the end of the rod by a nut and washer, and the end thus serves as a spindle on which the axle may turn. On and between the axle and bar are bearing rings or plates $h$ $h$, which steady the parts.

It will be seen that with this construction either forward wheel, $i$, is free to rise in passing over an obstruction without tilting or jarring the carriage-body; and, further, that the axle $g$ can be turned to a vertical position, as shown in Fig. 2, and in that position supports the forward part of the carriage independently of the forward wheel. In this last-named position of the axle and forward wheels the carriage is securely anchored, and may be left unattended without fear of its moving.

Having thus fully described my invention, I claim as new, and desire to secure by Letters Patent—

1. In a child's carriage, the fixed rod $f$, extending from the rear axle through a cross-bar, $d$, and having on its forward end a spindle on which the front axle turns, as described.

2. The combination of the rod $f$, rear axle, $b$, cross-bar $d$, and axle $g$, hung on the forward end of the rod, substantially as shown and described.

3. The combination, with the axle $g$ and cross-bar $d$, of the plates $h$ $h$, arranged as and for the purpose specified.

HIRAM SEAMAN.

Witnesses:
JAMES M. HENLEY,
C. SEDGWICK.